US005085515A

United States Patent [19]

Itoh et al.

[11] Patent Number: 5,085,515

[45] Date of Patent: Feb. 4, 1992

[54] METHOD AND APPARATUS FOR INSPECTING QUALITY OF MANUFACTURED ARTICLES

[75] Inventors: Hajime Itoh; Atsuo Itow; Yoshihiro Inoue, all of Omiya; Hiroshi Ishizaki, Shizuoka, all of Japan

[73] Assignee: Mitsubishi Metal Corporation, Tokyo, Japan

[21] Appl. No.: 476,725

[22] Filed: Feb. 8, 1990

[51] Int. Cl.[5] ........................ G01B 11/00; G01N 9/04; B21B 33/02

[52] U.S. Cl. .................................... 356/398; 356/240; 250/223 B; 72/4

[58] Field of Search ............... 356/398, 394, 237, 240, 356/428; 250/223 B, 227.23; 209/524, 526; 72/4

[56] References Cited

U.S. PATENT DOCUMENTS

| | | | |
|---|---|---|---|
| 4,075,086 | 2/1978 | Marsh, III et al. | 250/223 B |
| 4,140,072 | 2/1979 | Bartling et al. . | |
| 4,650,326 | 3/1987 | Nagamine et al. | 356/240 |
| 4,775,889 | 10/1988 | Yoshida | 356/240 |
| 4,831,250 | 5/1989 | Fukuchi et al. | 356/240 |
| 4,891,529 | 1/1990 | Braun et al. | 356/376 |
| 4,929,828 | 5/1990 | Claypool | 250/223 B |

FOREIGN PATENT DOCUMENTS

| | | |
|---|---|---|
| 0304164 | 2/1989 | European Pat. Off. . |
| 62-212031 | 9/1987 | Japan . |

*Primary Examiner*—Richard A. Rosenberger
*Assistant Examiner*—Hoa Pham
*Attorney, Agent, or Firm*—Oblon, Spivak, McClelland, Maier & Neustadt

[57] ABSTRACT

There is disclosed a method for inspecting a physical feature on a surface of a manufactured article. First, a sensor is provided adjacent to the article. Then, the surface of the article is sensed by the sensor while causing one of the sensor and the article to rotate about an axis perpendicular to the surface of the article, to thereby obtain a signal which has peaks corresponding to the physical feature on the surface of the article. Subsequently the signal is processed and the processed signal is analyzed based on the number of the peaks, to thereby obtain information as to the physical feature on the surface of the article. An inspection apparatus suitable for practicing the above-mentioned method is also disclosed.

4 Claims, 6 Drawing Sheets

METHOD AND APPARATUS FOR INSPECTING QUALITY OF MANUFACTURED ARTICLES

BACKGROUND OF THE INVENTION

1. Field of the Invention

The present invention pertains to a method and apparatus for inspecting the physical feature of manufactured articles, and in particular the presence and number of attachments or the like attached to the articles.

2. Prior Art

FIG. 1 is a plan view showing a top end (manufactured article) of a usual aluminum can. The top end, designated at 1, includes a top-end body 2 having a sector-shaped opening portion 4 surrounded by a weakened seam 3 and a tab ring (attachment) 5 securely fixed to the top-end body 2 by caulking, and is provided with lip beads 6 and 6 so as to sandwich the opening portion 4 therebetween.

When manufactured, the top end of the aforesaid construction is subjected to various inspections, which includes an inspection for the presence of the tab ring 5.

The inspection of the tab ring 5 has hitherto been conducted by making the operators check each top end 1 visually or by obtaining images of the top surface of the top end 1 with an area sensing camera and inputting the image signals to an image processing device to process the images.

However, the manufacturing number of top ends has increased rapidly due to a drastic increase in the demand for aluminum cans, and hence the operators tend to suffer from considerable burdens, thereby causing inspection errors easily.

Furthermore, in the inspection using image processing techniques, it takes much time to carry out the image processing, resulting in low efficiency of inspection. In addition, it has been difficult to install an automated inspection system in a high-speed manufacturing line.

SUMMARY OF THE INVENTION

It is therefore an object of the present invention to provide a method for inspecting quality of manufactured articles by which the physical feature of a surface of an manufactured article can be positively and rapidly inspected with automation.

Another object of the invention is to provide an inspection apparatus which can be utilized to carry out the aforesaid method.

According to a first aspect of the invention, there is provided a method for inspecting a physical feature on a surface of a manufactured article, comprising the steps of:

(a) providing sensing means adjacent to the article;

(b) operating the sensing means to sense the surface of the article while causing one of the sensing means and the article to rotate about an axis perpendicular to the surface of the article, to thereby obtain a signal which has peaks corresponding to the physical feature on the surface of the article; and (c) subsequently processing the signal and analyzing the processed signal based on the number of the peaks, to thereby obtain information as to the physical feature on the surface of the article.

According to a second aspect of the invention, there is provided an apparatus for inspecting a physical feature on a surface of a manufactured article, comprising:

(a) holding means for holding the article;

(b) first sensing means disposed adjacent to the holding means for sensing the surface of the article to obtain a first signal;

(c) rotating means for causing one of the first sensing means and the article to rotate about an axis perpendicular to the surface of the article such that the first signal outputted from the first sensing means has peaks corresponding to the physical feature on the surface of the article;

(d) a signal processing unit operably connected to the first sensing means for processing the first signal; and (e) means connected to the signal processing unit for analyzing the signal based on the peaks to obtain information as to the physical feature on the surface of the article.

DESCRIPTION OF THE PREFERRED EMBODIMENTS OF THE INVENTION

Figure 1:
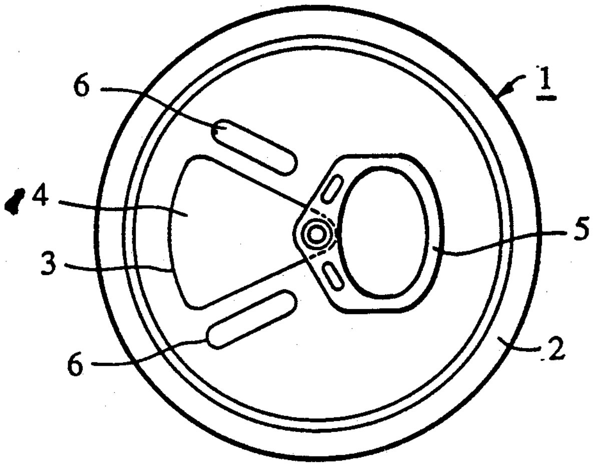
FIG. 1 is a plan view of a top end of a usual aluminum can.
Figure 2:
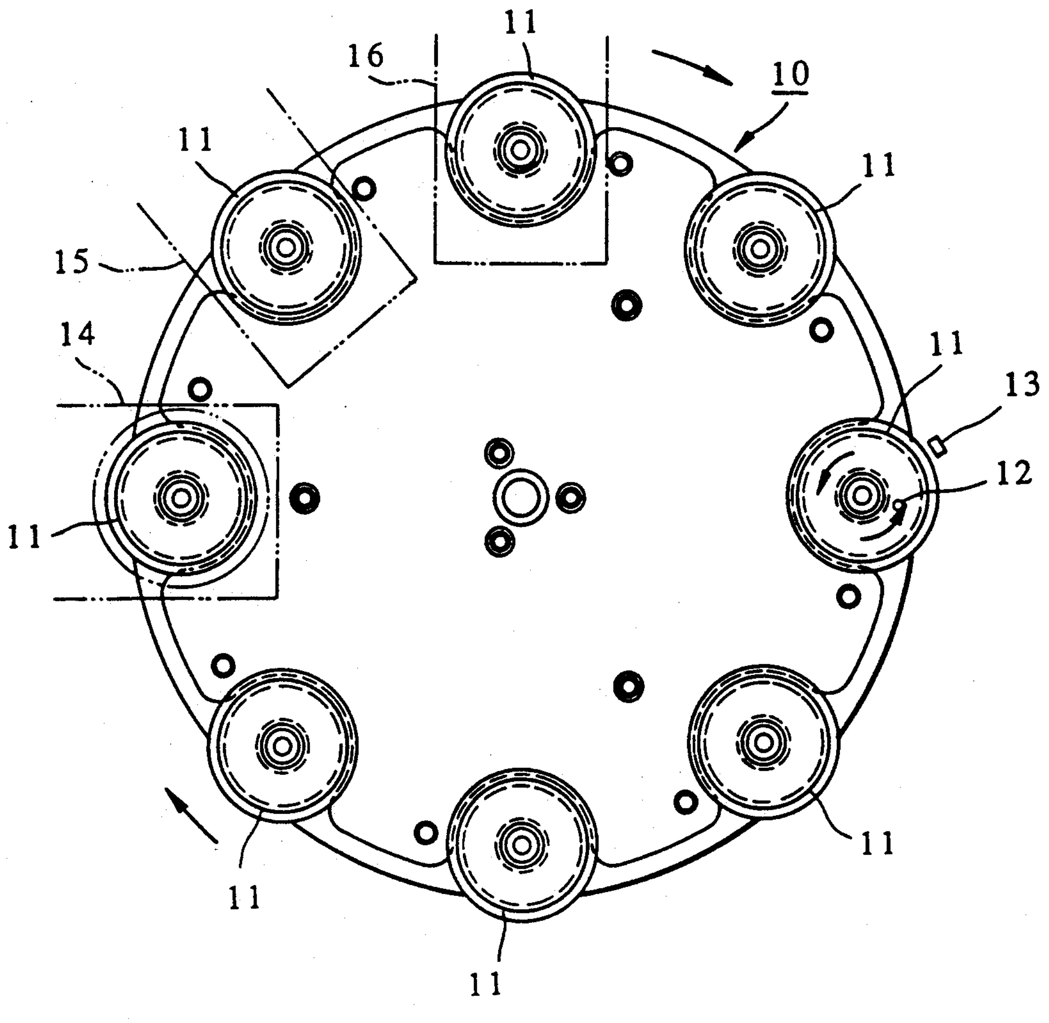
FIG. 2 is a schematic plan view of an apparatus for inspecting quality of manufactured articles in accordance with the present invention.
Figure 3:
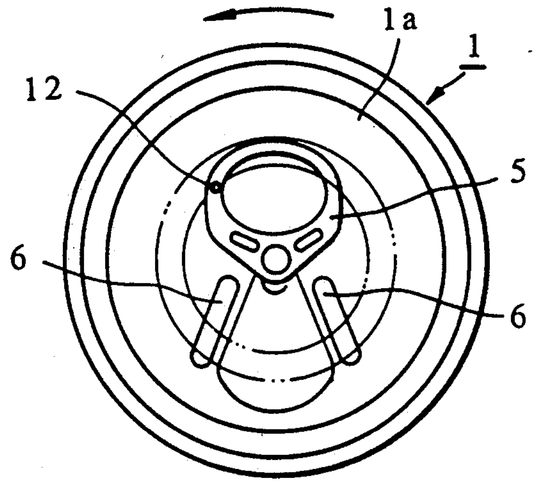
FIG. 3 is an enlarged view showing the position of a sensor.
Figure 4:
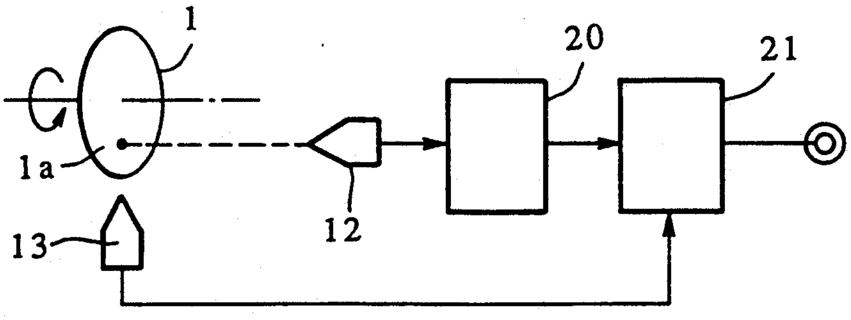
FIG. 4 is a block diagram of the inspection apparatus.

An apparatus for inspecting quality of manufactured articles in accordance with the present invention will first be described with reference to FIGS. 2 to 4. In FIG. 2, the numeral 10 denotes a turret for holding top ends 1 for aluminum cans that are conveyed from a manufacturing line. The turret 10, which is in the form of a disc, is rotatable about an axis thereof, and is provided with a plurality of holding portions 11 formed on the periphery of an upper surface thereof in circumferentially equally spaced relation to one another. Each of the holding portions 11 has a circular shape of a diameter generally equal to the top end 1, and is rotatable about its axis. Thus, the top end 1 is securely received on the holding portion 11 by a vacuum, so that it can be rotated about an axis thereof by the rotation of the holding portion 11.

In addition, a first sensor 12 for detecting the tab ring 5, which is, for example, comprised of an optical distance sensor (triangulation-type or quantity of reflected light-type), an ultrasonic sensor, an electrostatic sensor or an eddy-current sensor, is immovably disposed at a predetermined position above the periphery of the turret 10, and is operable to sense the distance between the sensor 12 and the to end 1 which is conveyed due to the rotation of the turret 10. As best shown in FIG. 3, the first sensor 12 is located above a prescribed holding portion 11 in such a manner that when a top end 1 without any defect is received by the holding portion 11 and rotated about its axis, the sensor 12 detects the tab ring 12 at least twice and the lip beads 6, and produces a first signal representative of the information as to the tab ring. Furthermore, a second sensor 13, which may be the one similar to the aforesaid sensor, is immovably located in a fixed position adjacent to the periphery of the turret 1 for detecting the top end 1 held by the holding portion or detecting the holding portion 11 itself, to produce a second signal representative of the cycle of rotation of the top end 1. In the preferred embodiment, a slit is formed in the holding portion 11, and the second sensor 13 is arranged so as to detect the slit to produce the aforesaid second signal.

The aforesaid first sensor 12 is connected to a signal processing circuit or unit 20 which is operable to process the signal outputted from the first sensor 12 and convert it to a binary signal based on a prescribed threshold. This signal processing unit 20 and the second sensor 13 are further connected to a counting circuit or an analyzer 21 which is operable to analyze the binary signal transmitted from the signal processing unit 20 with reference to the second signal representative of the cycle of rotation, to produce data or an output signal from which the operator or machine can determine whether the top end 1 held by the holding portion 11 is of good quality or not.

Moreover, a feed device 14 is disposed at a position symmetrical with respect to the axis of the turret 10 from the first sensor 12 and is operable to supply the holding portion 11, which has stopped at a position under the feed device 14, with a top end 1 which has been conveyed from the manufacturing line. Furthermore, an ejection device 15 is arranged adjacent to the feed device 14 for ejecting the top ends of good quality to a delivery line, while a discharge device 16 is adjacent to the ejection device 15 for discharging defected top ends 1.

The inspection method in accordance with the present invention will next be described.

First, a top end 1, which has been conveyed from the manufacturing line, is moved to and held by a prescribed holding portion 11 of the turret 10 through the feed device 14 in such a manner that its top surface la to be inspected faces upwards. Thereafter, the turret 10 is caused to rotate through an angle equal to a central angle defined between two adjacent holding portions 11 with respect to the rotational center, so that the top end 1 is moved to the next position.

The above-mentioned operation is repeated, and when the aforesaid top end 1 reaches a position where the first sensor 12 is arranged above it, the first and second sensors 12 and 13 are activated. Then, the first sensor 12 senses the top surface 1*a* of the top end 1 to produce a first signal which may have peaks produced by the presence of the tab ring 5 on the top surface 1*a*, and the signal processing circuit 20 processes the first signal to convert it into a binary signal, which is outputted to the analyzer 21. On the other hand, the second sensor 13 senses the rotation of the top end 1 to produce a second signal representative of the cycle of rotation of the top end 1 to input it to the analyzer 21, and in the analyzer 21, the first binary signal obtained for one cycle of rotation of the top end 1 is analyzed to produce data from which the information as to the presence of the tab ring 5 is obtained.

Figure 5:
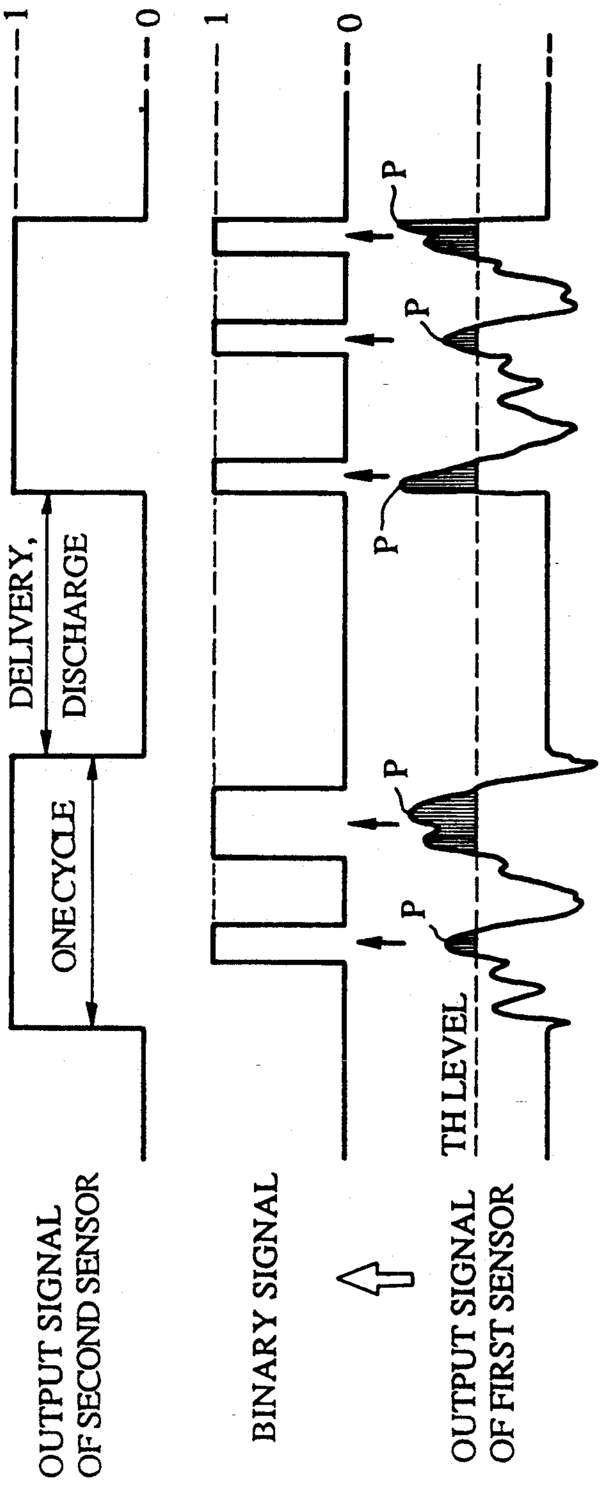
FIG. 5 is a timing chart of the signals processed in the apparatus.
Figure 6:
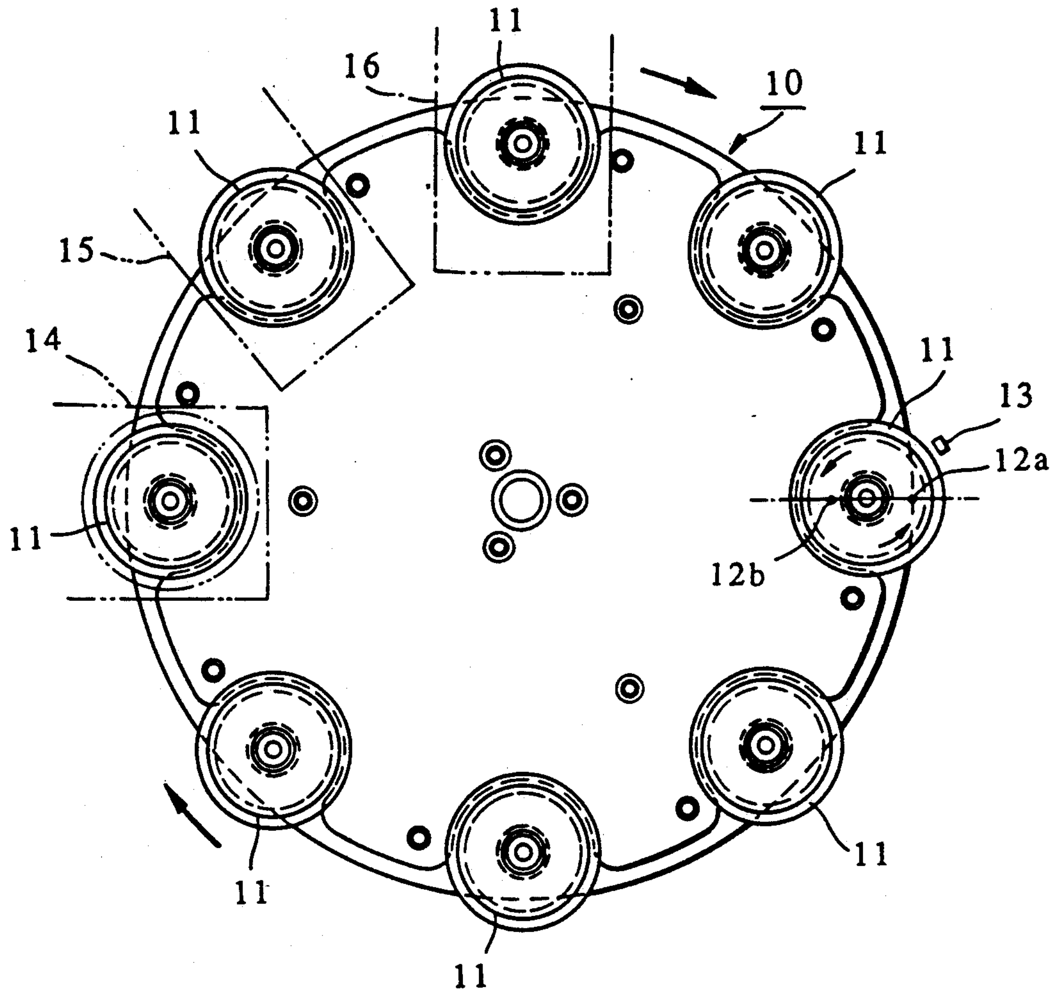
FIG. 6 is a view similar to FIG. 2, but showing a modified apparatus in accordance with the present invention.

More specifically, when the tab ring 5 is attached properly to the top surface 1*a* of the top end 1, the first sensor 12 produces a first signal which has peaks P as illustrated in FIG. 5. The number of the detected peaks P is three when the tab ring 5 is detected at the beginning of the sensing, but is two when a portion of the surface other than the tab ring 5 is detected at the beginning. This first signal is converted to a binary signal based on a prescribed threshold such that the peak P corresponds to "one" while the other portions correspond to "zero". The binary signal thus obtained is inputted to the analyzer 21, which analyses the signal to count the number of the peaks and judges the top end 1 as being of good quality when the number of the peaks is two or three. On the other hand, in the case where there is no tab ring 5 attached to the top end 1, the signal produced by the first sensor 12 has no peaks, and the analyzer 21 judges the top end 1 as being defective.

In the foregoing, inasmuch as the top-end body 2 is provided with the lip beads 6 formed thereon, the signal produced by the first sensor 12 exhibits peaks lower than the aforesaid peaks P, but these lower peaks are removed during the conversion of the signal into the binary code. Any peaks caused by a foreign material adhering to the top end 1 may similarly be removed.

After the analysis as to the presence of the tab ring 5 has been done as described above, the turret 10 is further rotated, and if defective, the top end 1 is discharged by the discharge device 16 while top ends 1 of good quality are ejected by the ejection device 16 to the delivery line. In this manner, the aforesaid operation is repeated to inspect all of the top ends 1 conveyed from the manufacturing line, and only the good top ends 1 are conveyed to the delivery line.

In the aforesaid method, the top surface 1*a* of the top end 1 is inspected while rotating the top end 1. If the tab ring 5 is properly attached to the top surface 1*a*, the first sensor 12 transmits a signal with at least two peaks. Therefore, the presence of the tab ring 5 can be rapidly and reliably inspected by counting the number of the peaks.

In addition, inasmuch as no image processing operation is required, a rapid inspection can be ensured, and hence the inspection operation for a high-speed manufacturing line can be easily automated.

In the foregoing, although the top end 1 is caused to rotate about its axis during the inspection for the presence of the tab ring, the first sensor 12 may be constructed so as to rotate about an axis perpendicular to the top end 1. In addition, the inspection apparatus of the invention may be modified such that it can be used to inspect for the presence and number of irregularities on a disc-shaped article such as a badge, or to inspect any projections and recesses formed on the various manufactured articles. If a photo sensor is used as the first sensor 12, the presence and number of bright or dark portions on the articles may be inspected.

FIGS. 6 to 10 depict a modified inspection apparatus in accordance with the present invention in which a pair of first sensors 12*a* and 12*b* are immovably arranged at positions above the periphery of the turret 10 for detecting the tab ring 5 on the top end 1 which is conveyed by the rotation of the turret 10.

Figure 7:
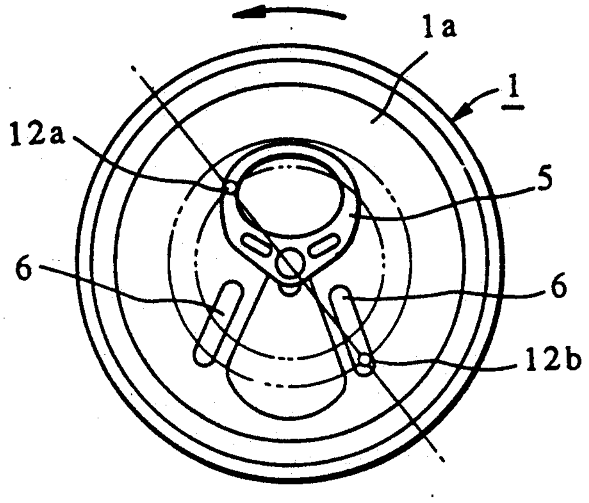
FIG. 7 is a view similar to FIG. 3, but showing the apparatus of FIG. 6.
Figure 8:
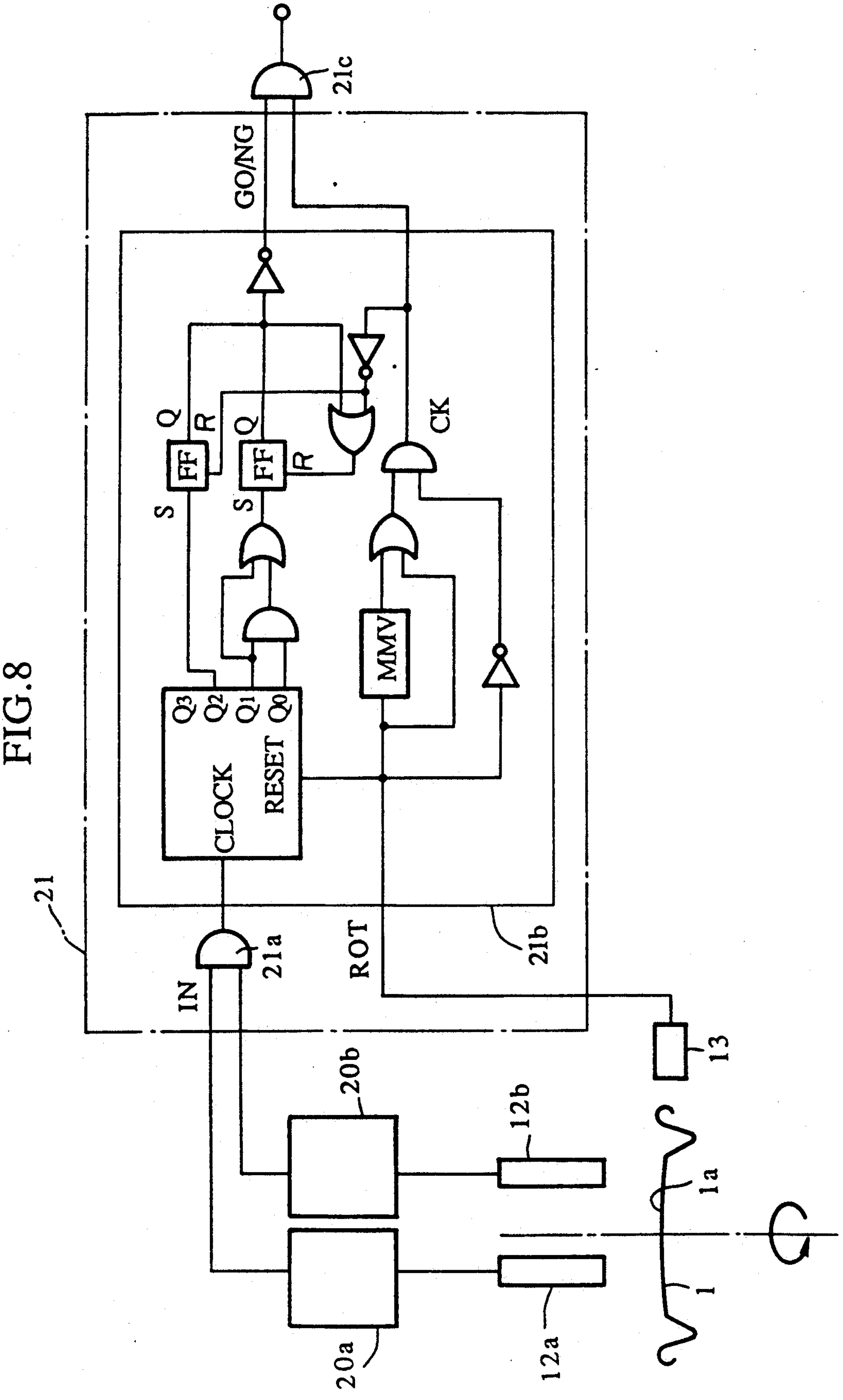
FIG. 8 is a block diagram of the apparatus of FIG. 6.

As shown by the small circles 12*a*, 12*b* in FIG. 7, the aforesaid first sensors 12*a* and 12*b* are located on a straight line passing through a diameter of the top end 1 in such a manner that the distance of the sensor 12*a* from the central axis of top end 1 is shorter than that of the sensor 12*b* therefrom, and that, when a top end 1 without defects is rotated about the central axis thereof one time, the sensor 12*a* detects the tab ring 5 at least twice and the lip beads 6 while the sensor 12*b* detects only the lip beads 6. The first sensors 12*a* and 12*b* are connected to signal processing units 20*a* and 20*b*, respectively, which are further connected to the analyzer 21. The analyzer 21 includes three AND circuits 21*a* and 21*c* and a pulse count-digital comparator 21*b* and is operable to process the inputted signals.

Figure 9:
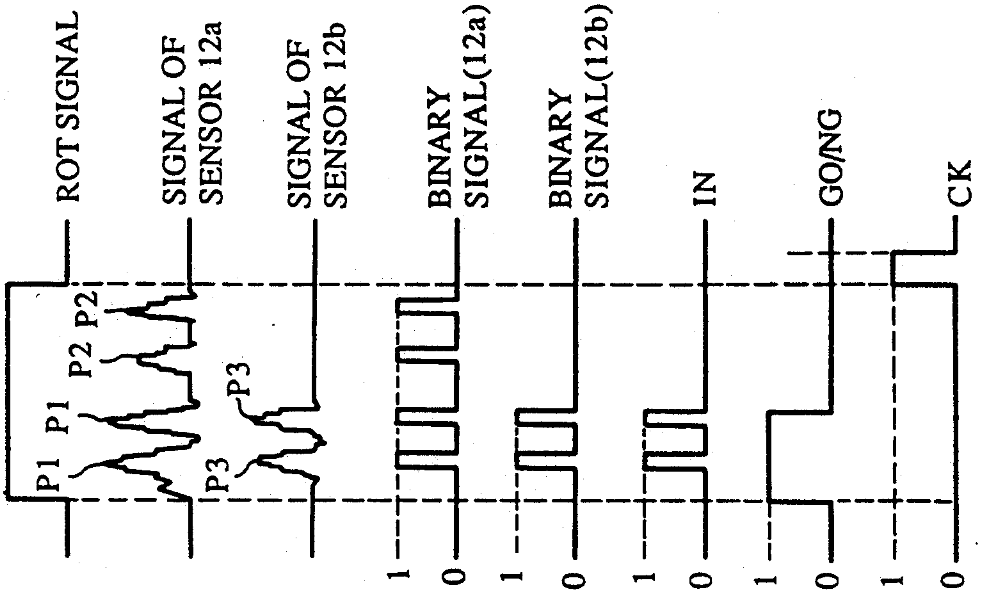

In the above embodiment, the turret 10 is rotated as is the case with the previous embodiment, and when the top end 1 is conveyed to a position below the first sensors 12*a* and 12*b*, the first sensors 12*a* and 12*b* and the second sensor 13 are activated. Then, the second sensor 13 senses the rotation of the top end 1 to produce a second signal (ROT signal) representative of the cycle of rotation of the top end 1 to input "one" to the analyzer 21 during one cycle of rotation of the top end 1, as illustrated in FIG. 9. In addition, the first sensors 12*a* and 12*b* sense the top surface 1*a* of the top end 1 to produce first signals which may have peaks produced by the presence of the tab ring 5 on the top surface 1*a*, and the signal processing units 20*a* and 20*b* process the first signals, respectively, to convert them into binary signals, which are outputted to the analyzer 21. More specifically, when the tab ring 5 is being attached properly to the top surface la of the top end 1, the first sensor 12*a* produces a first signal which has peaks $P_1$ based on the tab rings 5 and peaks $P_2$ based on the lip beads 6 while the second sensor 12*b* produces another first signal which has peaks $P_3$ caused by the lip beads 6, as illustrated in FIG. 9. The number of the detected peaks $P_1$ and $P_2$ of the signal produced by the first sensor 12*a* is four in total when a portion other than the tab ring 5 or the lip bead 6 is detected at the beginning of the sensing, and is six when the tab ring 5 or the lip beads 6 is detected at the beginning. On the other hand, the number of the detected peaks $P_3$ of the signal produced by another first sensor 12*b* is two when a portion other than the lip beads 6 is detected at the beginning of the sensing, and is three when the lip bead 6 is detected at the beginning. Furthermore, if the tab ring 5 is secured to a proper position between the lip beads 6, the sensor 12*b* detects the lip bead 6 at the same time when the sensor 12*a* detects the tab ring 5, so that the aforesaid peaks $P_1$ and $P_3$ are produced simultaneously.

After first or second derivatives of the above first signals are obtained as necessary, the signals are converted into binary signals based on thresholds such that the peak $P_1$, $P_2$ or $P_3$ corresponds to "one" while the other portions correspond to "zero", and are transmitted to the analyzer 21. Then, in analyzer 21, a logical AND operation is carried out by the AND circuit 21*a* on the binary signals to produce an IN signal, which outputs "one" when the peak $P_1$ coincides with the peak $P_3$ and outputs "zero" when the peaks $P_1$ and $P_3$ do not coincide. When the IN signal has two or three portions indicating "one" during one cycle of rotation of the top end 1, the top end 1 is judged as being of good quality.

Furthermore, the ROT signal inputted in the analyzer 21, is processed therein to produce a CK signal, which is active after the ROT signal becomes zero and remains unchanged for a prescribed period of time. The CK signal, however, becomes zero before the ROT signal becomes active next time. The pulse count-digital comparator 21*b* in the analyzer 21 begins to count the number of pulses of the IN signal when the ROT signal becomes "one", and works only when the ROT signal is active. When the ROT signal changes to "zero", the comparator 21*b* stops and holds the results at that time, and when the CK signal changes to "zero", it is reset and stops until the next ROT signal is produced.

Thus, there is produced an output signal GO/NG, which outputs "zero" at the second peaks of the IN signal and outputs "one" at the fourth peaks, Then, a logical "AND" operation is carried out by the AND circuit 21*c* on the CK signal and the GO/NG signal, the result of which is "zero" when the top end 1 is judged as being "normal".

Figure 10:
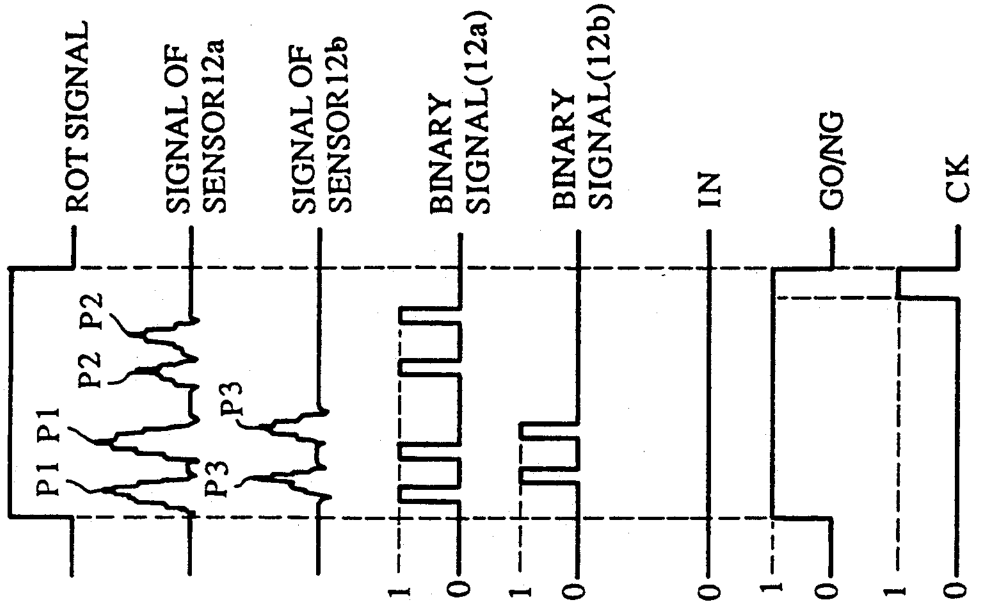
FIGS. 9 and 10 are timing charts for the apparatus of FIG. 6.

On the other hand, if the tab ring 5 is shifted from its proper position, the signal produced by the sensor 12*a* has peaks $P_1$ due to the tab ring 5 and peaks $P_2$ due to the lip beads 6, while the signal produced by the sensor 12*b* has peaks $P_3$ caused by the lip beads 6, as illustrated in FIG. 10. However, the peak $P_1$ and the peak $P_3$ emerge at different times, and hence when the signal processing operation is carried out on the binary signals of the respective signals, the IN signal thus produced has no portion indicating "one" and is outputted entirely as "zero". In this case the top end 1 is judged as being "abnormal".

Similarly, the signal processing operation is carried out on the ROT signal and the IN signal and further on the CK signal and GO/NG signal. This processed signal is outputted as "one" and the top end 1 is judged as being "abnormal".

Furthermore, if no tab ring 5 is attached to the top-end body 2, the signal produced by the sensor 12*a* does not have peaks $P_1$. Accordingly, the IN signal produced by the AND operation on the binary signals, which are obtained similarly, has no portion that is outputted as "one", and is judged as being "abnormal".

As described above, in the inspection method in accordance with the modified apparatus, if the tab ring 5 is attached to the proper position of the top end 1, the peak $P_1$ due to the tab ring 5 in the signal of the sensor 12*a* and the peak $P_3$ due to the lip beads 6 in the signal of the sensor 12*b* emerge at the same time. On the other hand, if the tab ring 6 is not in the proper position, the above peaks $P_1$ and $P_2$ are detected at different times. Accordingly, whether the tab ring 5 is attached to the proper position or not can be easily and surely inspected by judging whether time of detection of the peaks $P_1$ and $P_3$ coincides or not.

In the foregoing, the sensor 12*a* is arranged so that it detects the tab ring 5 and the lip beads 6 while the sensor 12*b* is arranged so as to detect only the lip beads 6. However, both the sensors 12*a* and 12*b* may be located so as to detect both the tab ring 5 and the lip beads 6. Furthermore, more than two sensors may be provided under some circumstances.

What is claimed is:

1. A method for inspecting an attachment on a surface of a manufactured article, comprising the steps of:

(a) providing sensing means adjacent to said article;

(b) operating said sensing means to sense said surface of said article while causing one of said sensing means and said article to rotate about an axis perpendicular to said surface of said article, to thereby obtain a signal which has peaks corresponding to the attachment on the surface of said article wherein said sensing means comprises a plurality of sensors disposes so as to sense points on said surface which are spaced by different distances from said axis perpendicular to said surface; and (c) subsequently processing said signal and analyzing the processed signal based on said peaks including the step of obtaining information as to the position of the attachment by comparing the positioning of the peaks with respect to each other, to thereby obtain information as to the attachment on said surface of said article.

2. An apparatus for inspecting an attachment on a surface of a manufactured article, comprising:

(a) holding means for holding said article;

(b) first sensing means disposed adjacent to said holding means for sensing said surface of said article to obtain a first signal;

(c) rotating means for causing one of said first sensing means and said article to rotate about an axis perpendicular to said surface of said article such that said first signal outputted from said first sensing means has peaks corresponding to the attachment on the surface of said article;

(d) a signal processing unit operably connected to said first sensing means for processing said first signal; and (e) means connected to said signal processing unit for analyzing said signal based on the peaks to obtain information as to the attachment on said surface of said article wherein said information obtaining means comprise the second sensing means disposed adjacent to said holding means for sensing the relative rotation of said article to produce a second signal representative of cyclic period of relative rotation of said article and an analyzer operably connected to said signal processing unit and said second sensing means for analyzing the peaks obtained during a predetermined cycle of relative rotation of said article wherein said analyzer comprises a means for counting the number of peaks during one cycle of relative rotation of said article to thereby obtain information as to the attachment on said surface of said article.

3. An inspecting apparatus as recited in claim 2, wherein said holding means comprises a turret having said rotating means which rotates said article.

4. An inspecting apparatus as recited in claim 2, wherein said signal processing unit comprises a circuit for converting said first signal into a binary signal.

* * * * *